United States Patent [19]

Smith, deceased

[11] 4,010,471

[45] Mar. 1, 1977

[54] POLARIZATION ROTATOR FOR PHASE ARRAY ANTENNAS

[75] Inventor: Bob L. Smith, deceased, late of Huntsville, Ala., Capt. Allen Bond Adams, executor

[73] Assignee: The United States of America as represented by the Secretary of the Army, Washington, D.C.

[22] Filed: June 20, 1975

[21] Appl. No.: 588,983

[52] U.S. Cl. ................................ 343/754; 343/756; 343/854

[51] Int. Cl.² .................... H01G 3/14; H01G 19/10; H01G 19/18

[58] Field of Search ............................ 343/754, 756

[56] References Cited

UNITED STATES PATENTS

| | | | |
|---|---|---|---|
| 3,049,708 | 8/1962 | Berkowitz | 343/756 |
| 3,305,867 | 2/1967 | Miccioli et al. | 343/754 |
| 3,631,503 | 12/1971 | Tang et al. | 343/754 |
| 3,697,998 | 10/1972 | Schaufelberger | 343/754 |
| 3,714,652 | 1/1973 | Grabowski | 343/756 |
| 3,761,936 | 9/1973 | Archer et al. | 343/754 |
| 3,803,618 | 4/1974 | Coleman | 343/754 |

*Primary Examiner*—Alfred E. Smith
*Assistant Examiner*—David K. Moore
*Attorney, Agent, or Firm*—William G. Gapcynski; Lawrence A. Neureither; Robert C. Sims

[57] ABSTRACT

The polarization control of the antenna is obtained by space feeding the signals through a polarization control rotator to a monópulse feedhorn.

1 Claim, 2 Drawing Figures

POLARIZATION ROTATOR FOR PHASE ARRAY ANTENNAS

DEDICATORY CLAUSE

The invention described herein may be manufactured, used, and licensed by or for the U.S. Government for governmental purposes without the payment to me of any royalties thereon.

BACKGROUND OF THE INVENTION

It is often necessary to provide polarization rotation for phased array antennas. The need arises in airborne or other mobile antennas where polarization orientation must be maintained despite vehicle motion. It also arises in ground-based, wide-scan coverage versions of the Dome Antenna.

Normally the necessary polarization control is obtained by the use of polarization controls at each array antenna element; thousands of such controls are needed, with large cost and complexity penalties. The invention to be outlined below requires at each antenna element only the use of a phase shifter and element that will support all polarizations. The phase shifter and element need not be fully polarization insensitive; they need only to be amplitude insensitive. Phase sensitivity can be handled by resetting the existing phase shifters. Such devices can be considerably less expensive and complex than full polarization controls. Polarization control in this concept is applied only once — at the feedhorn in a space-fed array.

DESCRIPTION OF THE PREFERRED EMBODIMENT

Figure 1:
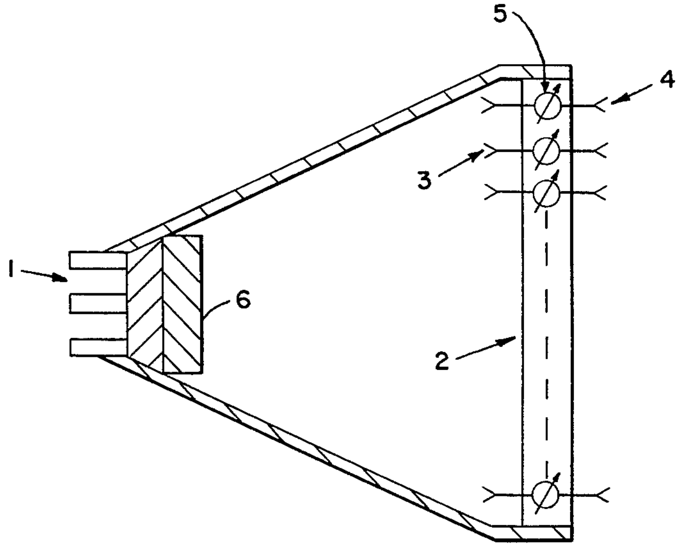
FIG. 1 is a cross sectional view of one embodiment of the present invention.

FIG. 1 is a side view of the first embodiment of the present invention. A five-horn monopulse feed 1 shown in section is provided to receive or transmit radiation to or from the polarization insensitive lens 2. The lens consists of two sets of arrays of antenna elements 3 and 4 which communicate through phase shifters 5. Phase shifters 5 are used to provide beam steering and to correct line length differences and polarization phase sensitivities of the elements if necessary.

The polarization (or the apparent orientation) of the feed is caused to rotate by a rotator 6 placed between the feedhorns 1 and the lens 2. The rotator 6 may be either electronic (a ferrite Faraday rotator, Contemporary Physic Vol. 14, 1973, pages 201–211 for example) or mechanical. With the use of the rotator the orientation of the elevation and azimuth beam position control axis automatically rotates in synchronism with the polarization.

Figure 2:
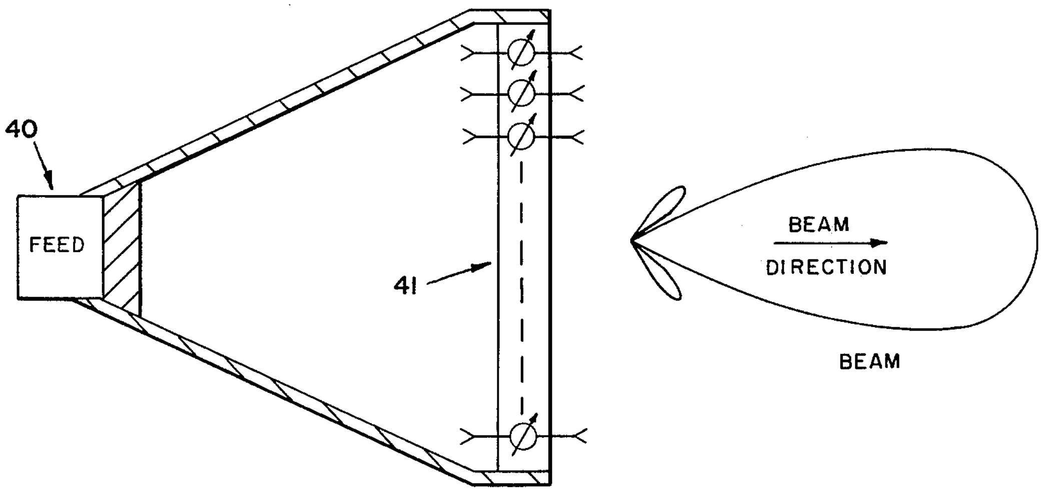
FIG. 2 is a through lens application of the invention.

The overall structure of the lens is similar to that of any of the space-fed array antennas. The practical use of the device may take the form of a gyro connected to the rotator 6 so as to keep it oriented to the ground or some other reference either through the orientation of the horn and lens can shift with the movement of a vehicle. In this way the alignment of the polarization would be maintained with respect to the reference of the rotator. FIG. 2 is a feed through lens application wherein the feed construction 40 consists of the combination of the monopulse feedhorn and rotator as shown in FIG. 1. The feed through lens application has a configuration similar to that shown in FIG. 1 and the beam direction and polarization orientation is controlled by the feed 40. The system of FIG. 2 has a polarization insensitive lens 41 which is made up the same basic configuration as that shown in FIG. 1. The operation is the same as any conventional space-fed array.

I claim:

1. A system comprising feedhorn subsystem; a two dimensional array of polarization insensitive antenna elements arranged as an adjustable feed through lens; electromagnetic energy being space-fed between said subsystem and said antenna elements; polarization control means connected to said feedhorn subsystem so as to control the polarization of said energy; said polarization control means is a polarization rotator spatially located between said subsystem and said antenna elements; said feedhorn subsystem comprises a plurality of horn monopulse feeds; and said rotator being located adjacent to said plurality of feeds.

* * * * *